United States Patent [19]
Eberhardt

[11] Patent Number: 5,128,033
[45] Date of Patent: Jul. 7, 1992

[54] OIL SEPARATOR

[76] Inventor: H. Alfred Eberhardt, Hale Fire Pump Company, 700 Spring Mill Ave., Conshohocken, Pa. 19428

[21] Appl. No.: 558,693

[22] Filed: Jul. 26, 1990

[51] Int. Cl.⁵ .................... E02B 15/04; B01D 17/038
[52] U.S. Cl. ............................... 210/232; 210/242.3; 210/512.1; 210/512.3; 210/923
[58] Field of Search ................. 210/232, 242.3, 923, 210/512.1, 512.3

[56] References Cited

U.S. PATENT DOCUMENTS

| | | | |
|---|---|---|---|
| 3,756,294 | 9/1973 | Rainey | 210/923 |
| 3,800,951 | 4/1974 | Mourlon | 210/923 |
| 3,812,968 | 5/1974 | Aramaki et al. | 210/923 |
| 4,139,470 | 2/1979 | Stagemeyer et al. | 210/923 |
| 4,209,400 | 6/1980 | Mayes | 210/242.3 |
| 4,282,679 | 1/1980 | Van Hekle | 210/242.3 |
| 4,360,429 | 11/1982 | Morris | 210/923 |
| 4,478,712 | 10/1984 | Arnaudeau | 210/512.3 |
| 4,514,299 | 4/1985 | Ayroldi | 210/923 |
| 4,702,837 | 10/1987 | Lecoffre et al. | 210/512.3 |
| 4,851,133 | 7/1989 | Rymal | 210/923 |

FOREIGN PATENT DOCUMENTS

2042355 9/1980 United Kingdom .

Primary Examiner—Stanley S. Silverman
Assistant Examiner—Christopher Upton
Attorney, Agent, or Firm—Frank A. Follmer

[57] ABSTRACT

An oil skimmer and separator for use in cleaning up oil spills utilizes a light weight water driven turbine for driving the oil separating means. The device is adapted to be powered by existing firefighting equipment such as fire pumps on ships and on fire trucks.

22 Claims, 5 Drawing Sheets

OIL SEPARATOR

BACKGROUND AND SUMMARY OF THE INVENTION

This invention relates generally to oil separators and, more specifically, to an oil skimmer and separator for use in cleaning up oil spills.

In the case of an oil spill, it is important that the clean-up operation begin as soon as possible so as to limit the spreading of the oil away from the site of the spill. Accordingly, it would be desirable to have a clean-up device that can be handled and deployed quickly and easily and that can be conveniently stored on an oil transport ship or at a site where an oil spill could occur. Furthermore, it would be desirable to power such a device with existing emergency fire fighting equipment, such as fire pumps on ships and on fire trucks. It would also be desirable that the clean-up device can be carried on small boats or helicopters.

To this end, the oil skimmer and separator in accordance with the invention is constructed to be light in weight and of a size and configuration such that it can be stored on a ship or on a dock conveniently, and can be carried by small boats or helicopters. Furthermore, the device in accordance with the invention is designed so that it can be deployed onto a body of water where the oil spill has occurred so as to float near the surface of this body of water in a manner to skim the oil/water mixture from the oil spill for separation purposes. Thus, the oil skimmer and separator in accordance with the invention utilizes light weight water-driven turbines for driving the oil separating mechanisms, which may include an oil discharge pump. Water-driven turbines can be made light in weight and still provide the horsepower necessary to drive the oil separating mechanisms. Also, because they are light in weight, the water-driven turbines can be floated easily.

Generally speaking, oil transport ships are heavily equipped with fire fighting pumps and hoses, thereby providing a readily available source of high pressure water power. It is this source of water power that can be used by the device of the invention to drive the light weight water turbines employed therein. It is also to be noted that should the oil spill occur near a shore, fire trucks could be used in such an emergency to supply the high pressure water and hoses to drive these water turbines.

DETAILED DESCRIPTION OF THE PREFERRED EMBODIMENT

The oil skimmer and separator of the invention comprises a long tube 10 providing an elongated flow passage 12 having a circular cross-section. By way of example, tube 10 may comprise an eight inch I.D. PVC thick-walled tube about thirty feet in length. Tube 10 is coupled at one end to an inlet unit 14 by means of a quick-connect coupling 15 and at its other end to a discharge unit 16 by a quick-connect coupling 17.

Figure 3A:
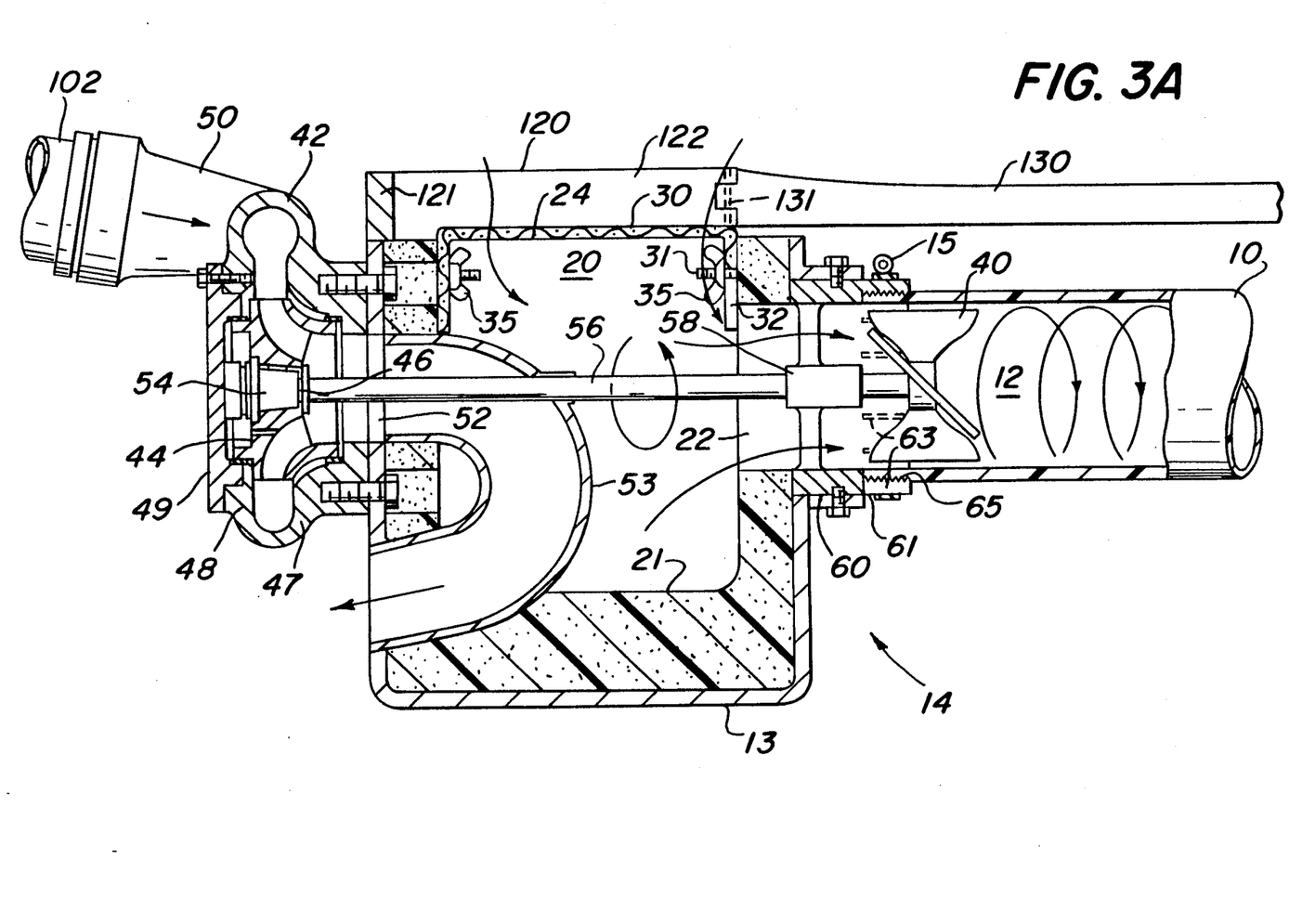
FIGS. 3A and 3B are enlarged sectional views of the oil skimmer and separator shown in FIG. 1.

Inlet unit 14 comprises means defining an inlet chamber 20 at one end of flow passage 12 for receiving an oil/water mixture from the surface of a body of water containing an oil spill. Thus, inlet unit 14 includes a frame 13 and a float portion 21 having a cavity which defines the generally rectangular inlet chamber 20. Float portion 21 also provides a circular passage 22 aligned with the inlet end of flow passage 12 so as to provide flow communication between inlet chamber 20 and the inlet end of flow passage 12, as is shown in FIG. 3A.

Inlet chamber 20 is provided with an inlet opening 24 in the top thereof constructed and arranged to receive the in-flow of an oil/water mixture from the body of water in which the device is immersed. Means are provided for controlling the flow of the oil/water mixture through the inlet opening 24 into inlet chamber 20. Such means comprises a coarse screen 30 mounted on top of inlet unit 14 and extending across the inlet opening 24. Screen 30 is secured to frame 13 by bolts 31 which engage within slots 32 in screen 30 and cooperate with wingnuts 35 so as to be adjustable vertically relative to the inlet opening 24. This provides for the adjustment of the level at which the oil/water mixture will be best skimmed through inlet opening 24 into the inlet chamber 20. By this arrangement, the inlet flow control means can be adjusted so that the oil/water mixture will be skimmed from a location just below the surface of the body of water and this location can be adjusted to take into account the wave action of said body of water and the variation in the density thereof.

Means are provided for causing the oil/water mixture to flow from inlet chamber 20 through the flow passage 12 in a spinning flow path both tangentially and axially from the inlet end of flow passage 12 to the discharge end thereof in a manner such that the oil concentrates in the center of said flow path. Such means comprises an axial flow impeller 40 located at the inlet end of flow passage 12 and a water driven turbine 42 constructed and arranged to cause rotation of impeller 40. By way of example, the water driven turbine 42 is a twenty-five horsepower, radial reaction turbine, such as the "TYPHOON" turbine manufactured by Hale Fire Pump Company. Turbine 42 comprises a runner 44 mounted on and keyed to a shaft 46 to rotate within the interior of the turbine housing 48, which comprises a volute body 47 and a head 49 and is provided with an inlet 50 and an outlet 52 for directing water into and out of the housing 48. The volute body 47 and head 49 are connected together by bolts at mating surfaces suitably sealed. The shaft 46 is rotatably supported by a thrust and sleeve bearing means 54 contained in the head 49 of the turbine housing 48. The runner 44 is mounted on and keyed to the shaft 46 by a conventional mounting arrangement as shown in FIG. 3A. The turbine shaft 46 has an extension 56 which is supported at its extended end in a bearing 58 provided by a spider-like support means 60. The outer end of the shaft extension 56 has mounted thereon the axial flow impeller 40 as is shown in FIG. 3A. Impeller 40 is formed by four circumferentially equally spaced blades which are constructed and arranged to produce said spinning flow path of the oil/water mixture. Turbine outlet 52 is connected to a discharge conduit 53 which directs the water discharged from turbine 42 to flow into the body of water in which the device is immersed.

As the impeller 40 is caused to rotate by the water driven turbine connected thereto through the shaft extension 56, the impeller 40 draws the oil/water mixture from inlet chamber 20 into the inlet end of flow passage 12 and drives this oil/water mixture down the flow passage 12 in a spinning fashion. At the same time, the oil/water mixture on the surface of the oil spill is drawn into inlet chamber 20 through screen 30 which is positioned to skim said mixture from the surface of the body of water containing said spill. As the oil/water mixture continues to spin as it moves down the flow passage 12, the lighter oil will concentrate in the center of this spinning liquid while the water will concentrate in the peripheral portion thereof. Thus, the oil and water will be more or less segregated when this spinning liquid reaches the discharge end of flow passage 12, as shown in FIG. 3B.

Means are provided for collecting the oil in the center of the spinning flow path as it flows to the other end of the flow passage 12. Such means includes an oil collection means located at the center of the outlet end of circular flow passage 12 and constructed and arranged to direct the collected oil to a discharge from said outlet end. The oil collection means comprises a collector tube 64 mounted, by means of a spider-type bearing means 66, for rotation about the central axis of tube 10 and provided with circumferentially extending radial slots 64A providing openings at its upstream end for receiving the inflow of the oil. Tube 64 provides a rotating suction line integrated with the impeller 70 of a centrifugal oil pump 72 mounted as part of the discharge unit 16, as shown in FIG. 3B. The collection means also comprises a cone-shaped member or funnel 74 which is mounted on the upstream end of the collector tube 64, for rotation therewith, by a spider-type support 76 to be concentric therewith and to converge in the direction of flow, as shown in FIG. 3B. The member 74 is open at each end and is provided with circumferentially extending radial slots 75 providing openings therein. The member 74 and collector tube 64 function, by reason of their rotation, to increase the rotational velocity of the spinning liquid flowing along the length of the flow passage 12 to thereby improve the separation of the oil and water, with the water flowing towards the periphery by centrifugal force and the lighter oil concentrating in the center of the flow path. The water at the periphery of the liquid flows along the length of the tube 10 and is accumulated in an outlet chamber 80 at the discharge end of the tube 10 and delivered downwardly through an outlet tube portion 82, as is shown in FIG. 3B, into the body of water. The oil which enters the collector tube 64 (which provides the suction line for impeller 70) flows axially therethrough into the interior of the impeller 70 and the pump 72 and is discharged therefrom to flow upwardly through a discharge hose 84.

Figure 1:
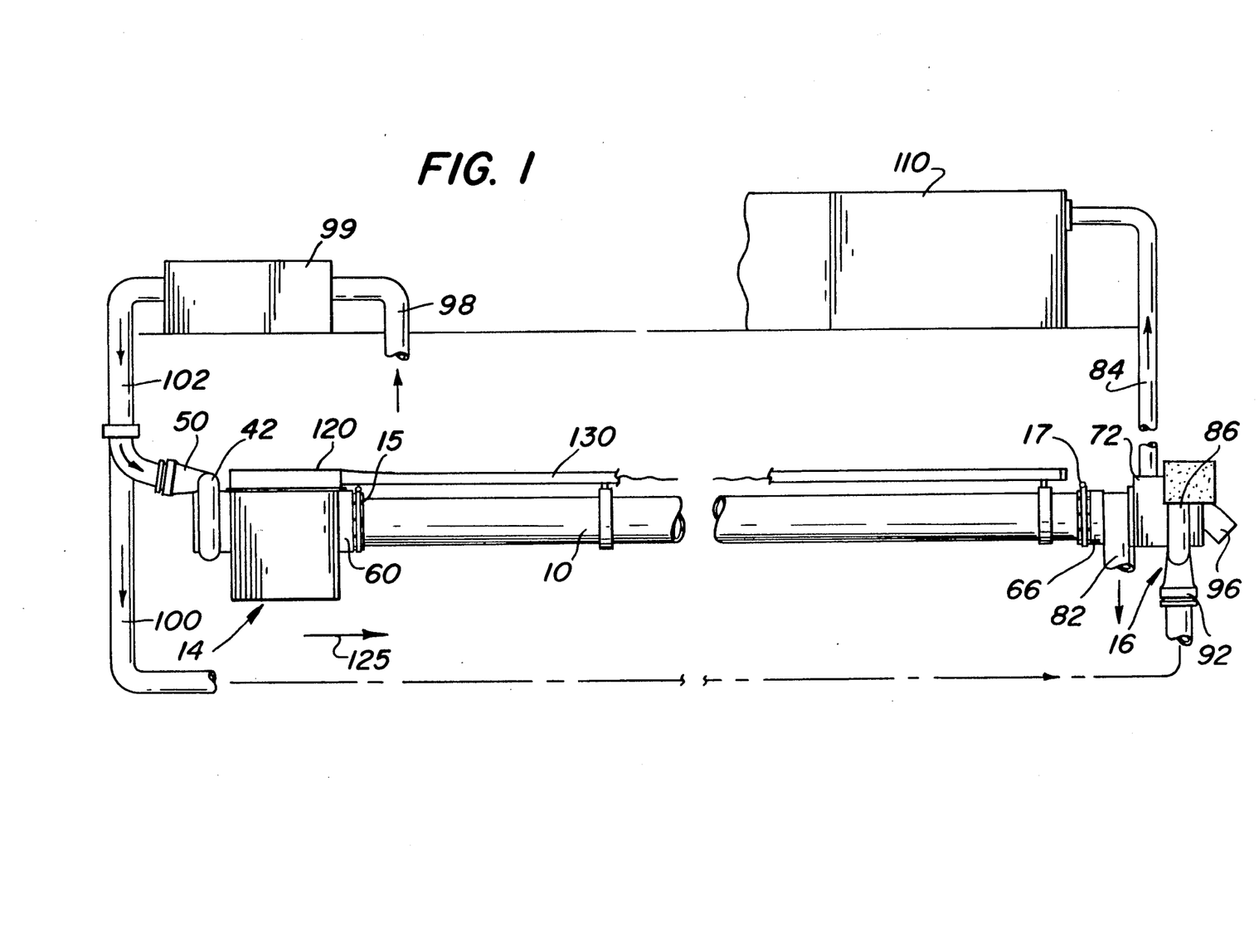
FIG. 1 is an elevational view showing the oil skimmer and separator in accordance with the invention.

The centrifugal pump 72 serves to pump the collected oil from the discharge of the device to a surface or storage location. The pump 72 is driven by a second water driven turbine 86 similar to the water driven turbine 42. Thus, turbine 86 comprises a runner 87 mounted on and keyed to one end of a shaft 88 to rotate within the interior of the turbine housing 89 which comprises a volute body 90 and a head 91 and is provided with an inlet 92 and outlet 93 for directing water into and out of the turbine housing. The volute body 90 and a head 91 are connected together by bolts at mating surfaces suitably sealed. The shaft 88 is rotatably supported by a suitable bearing means 94 contained in the head 91 of the turbine housing 89. The turbine runner 87 is mounted on and keyed to the rearward end of the shaft 88 by a conventional mounting arrangement as shown in FIG. 3B. Shaft 88 is coupled to shaft 71 of pump 72, which shaft 71 drives the pump impeller 70. High pressure water is supplied to inlet 92 to drive the turbine 86 through a supply tube 100 that extends underneath the discharge unit 16 as shown in FIG. 1. The water is discharged from the turbine through a downwardly directed spout 96 so as not to interfere with the oil/water mixture on the surface of the body of water.

Figure 3B:
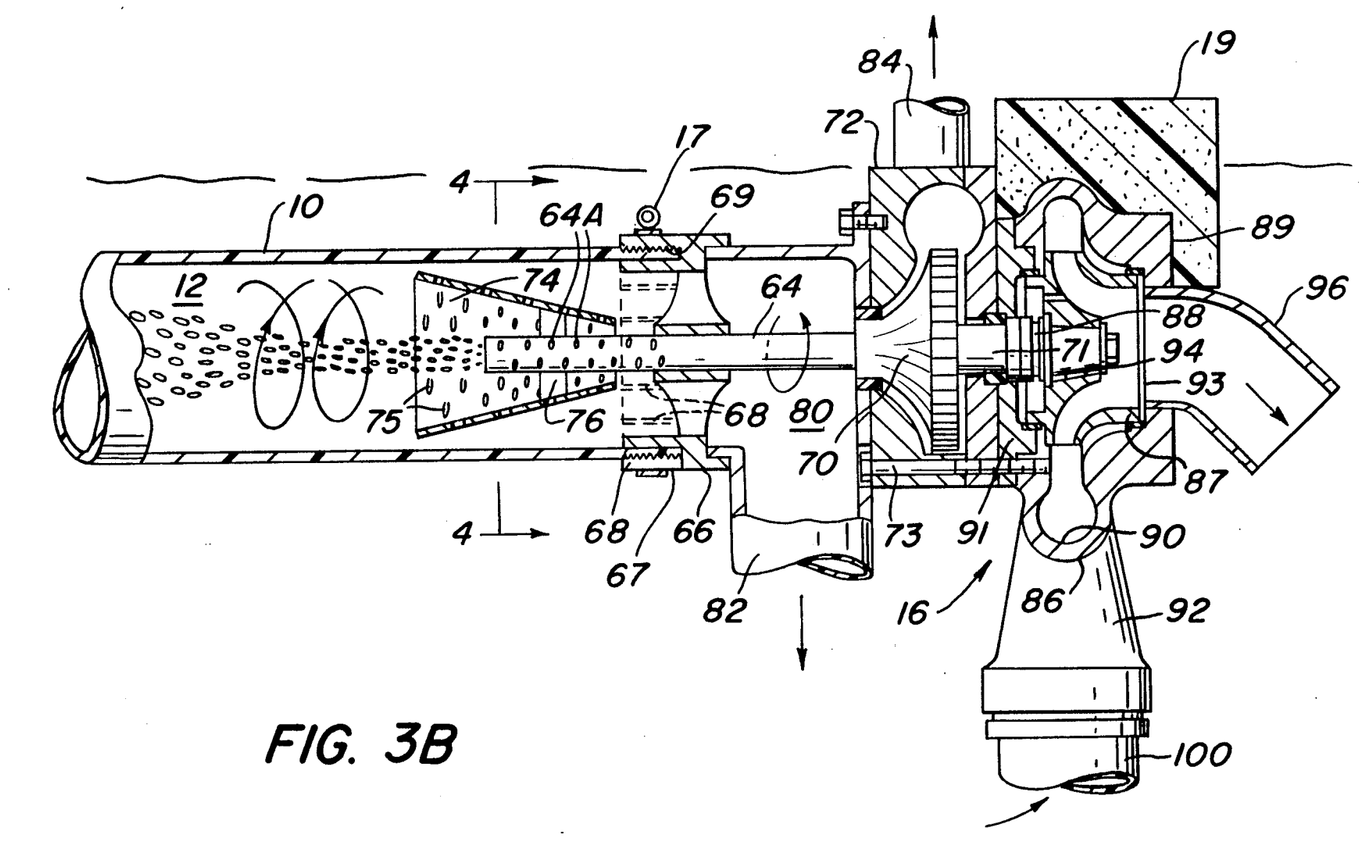
Figure 4:
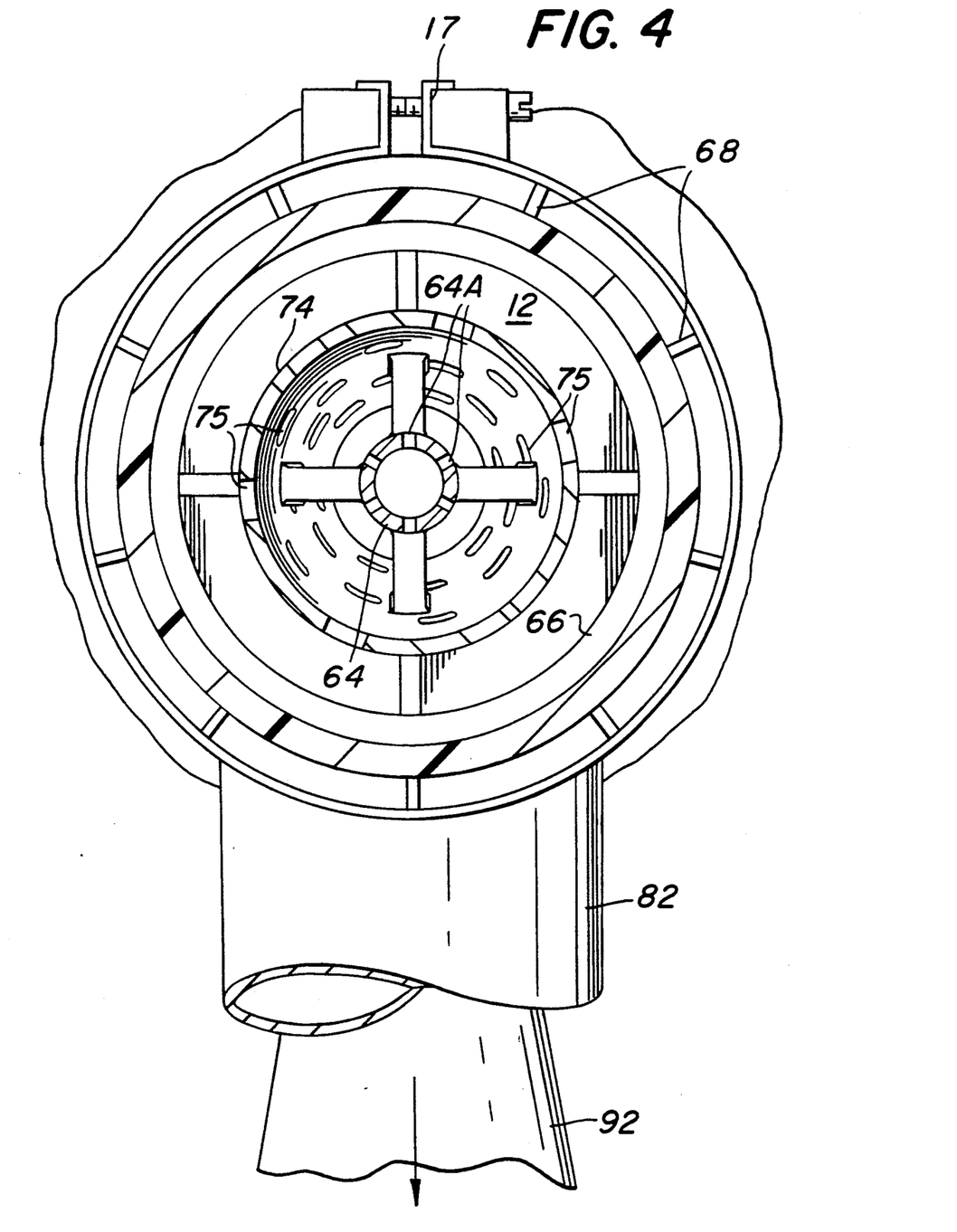
FIG. 4 is a sectional view taken generally on line 4—4 of FIG. 3B.

As shown in FIG. 3B, the discharge unit 16 is comprised of several parts connected together. Thus, discharge unit 16 comprises a float means 19, turbine 86 which is received in a large cavity in float means 19, pump 72 which is mounted together with turbine 86 by means of mounting bolts 73, the outlet tube portion 82 which is bolted to pump 72, and the spider bearing means 66 which is, by a press fit, secured to outlet tube portion 82 at cooperating tube portions as shown in FIG. 3B.

The high pressure water supply for the water driven turbines 42 and 86 may take various forms depending on the location where the oil skimmer and separator device of the invention will be used. As shown in the Drawings, a ship's fire pump 99, such as one that supplies 250 gallons per minute at 150 PSI, is arranged to supply water to a pair of 2½ inch fire hoses 100 and 102. The suction of pump 99 is arranged to draw sea water through an inlet 98 which extends therefrom into the water beneath the ship. Supply hose 102 has its discharge end connected to inlet 50 of turbine 42 for supplying high pressure water thereto for driving the same. Supply hose 100 has its discharge end connected to inlet 92 of turbine 86 for supplying high pressure water thereto for driving the same.

Figure 2:
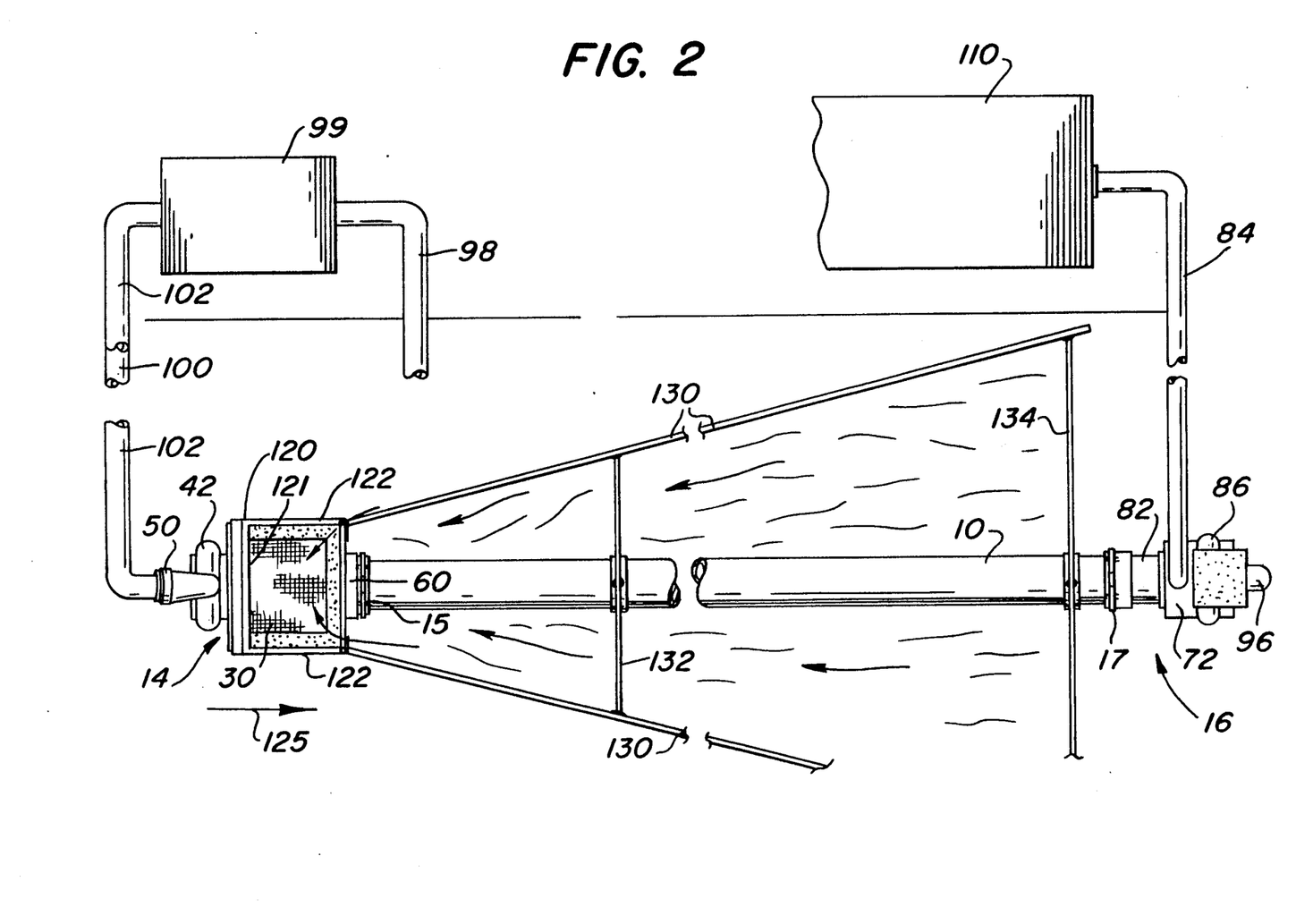
FIG. 2 is a plan view of the oil skimmer and separator shown in FIG. 1.

The means for receiving the separated oil delivered from the oil pump 72 through line 84 may take various forms depending on the location where the device is used. As shown in FIGS. 1 and 2, the oil receiving means comprises a tank 110, which may be an expandable type, located on board the ship. It will be apparent that the discharge from the oil pump 72 could also be directed into an empty tanker or into another type of tank, such as a plastic or rubberized, re-enforced bag for hauling off for further processing at shore.

As stated above, the oil separator and skimmer device of the invention lends itself to emergency situations where it is necessary to quickly deploy the device for operation without necessarily taking the time to get heavy equipment on the scene. To this end, the device is made of three separate units, namely, the inlet unit 14, the long tube 10 and the discharge unit 16. Also, means are provided for quickly connecting the inlet unit 15 to one end of tube 10 and the discharge unit 16 to the other end of tube 10. The quick-connect means at the inlet end of tube 10 comprises the quick-connect coupling 15 which is adapted to extend around a tubular extension 61 of member 60. The tubular extension 61 is provided with longitudinally extending slots 63 and defines a bore 65 provided with serrations and adapted to receive the upstream end of tube 10. In use, the upstream end of tube 10 is inserted within the bore 65 in the tubular extension 61 and the quick-connect unit 15 is moved to its clamping condition to press the tubular extension 61 at the serrations thereof into tight frictional engagement with the end of tube 10 therewithin.

In a like manner, the member 66 is provided with a tubular extension 67 provided with longitudinal slots 68 and defining a bore 69 provided with serrations and adapted to receive the downstream end of tube 10, as shown in FIG. 3B. The quick-connect means 17 is arranged to be actuated to a clamping position to thereby cause radial inward movement of the tubular extension 67 so that it provides a tight frictional engagement at its serrations with the outer wall of the downstream end of tube 10, as is shown in FIG. 3B.

Means are provided for containing an oil/water mixture build-up above the inlet opening 24 and screen 30. To this end, there is provided a catch basin 120 extending around the inlet opening 24 to confine a build-up of the oil/water mixture above the inlet opening 24 and the screen 30. The catch basin 120 comprises a three-sided upright wall means extending around inlet opening 24 and projecting vertically upwardly therefrom, said wall means including an aft wall 121 and a pair of side walls 122 defining an open mouth opposite aft wall 121.

There is also provided means for directing the oil/water mixture from the surface of the body of water into the mouth of the catch basin 120 as the device is moved through the water in the direction of the arrow 125 as shown in FIGS. 1 and 2. Such means comprises a pair of elongated members 130, in the form of vertical boards, each extending from an end of a side wall 122 forwardly from the catch basin 120 in a diverging relation relative to one another and to the tube 10 as is best shown in FIG. 2. Ideally, the aft portion of the boards 130 are tapered, as is best shown in FIGS. 1 and 3A, and the boards 130 are made of a material, such as wood, that would float in the water with a portion thereof extending above the water level. Also, the boards 130 are restrained by "nylon" ropes 132 and 134 at their extended portions and are hinged at their aft end at a hinge means 131 best shown in FIG. 3. By this arrangement, the boards 130 could be folded or attached to the pipe 10 and then inserted into place at the hinge means 131. In use, the boards 130 will spread out as the device is pushed through the water in the direction of the arrow 125 with the ropes 132 and 134 limiting their spreading to a predetermined angle of divergence as shown in the drawings. Also, as the device is pushed across the water, the boards 130 provide a wide swath which serves to skim the oil on the surface of the body of water and direct or concentrate this surface oil into the catch basin 120 overlying screen 30.

It will be noted that in the use of the device in accordance with the invention, there are multiple stages of separation of the oil from the water. The first stage of oil-water separation occurs as the device is pushed through the water by the action of the boards 130 skimming off the oil from the surface of the water and directing it into the inlet opening 24 through the screen 30. The next stage of oil-water separation occurs by the spinning action of the impeller 40 that, again, separates oil from the water with the heavier water going to the outside of flow passage 12 and the lighter oil being concentrated in the center thereof. The next stage in the oil-water separation is produced at the inlet to oil pump 72 where the conical member 74 and collector tube 64 accelerate the spilling action to increase the radial angular velocity of the oil/water mixture, which causes the water to be thrown outwardly and directs the oil inwardly for the further concentration of the oil in the center of flow passage 12 for collection by the oil collecting tube 64 whereby the pump 72 will operate to pump nearly pure oil back through to the collecting tank 110 as discussed above.

It will be apparent that various changes may be made in the construction and arrangement of parts without departing from the scope of the invention as defined by the claims. Thus, there are several arrangements that could be used to supply high pressure water to drive the water driven turbines. As shown in the drawings, each of the water driven turbines 42 and 86 is supplied by its own discharge hose coming from the pump 99, whereby these turbines are, in essence, running in parallel. Alternatively, you could have the two turbines 42 and 86 piped in series and have only one fire line from the fire main, i.e., pump 99, putting out 250 gallons per minute at 150 PSI. Thus, the first turbine 42 is supplied with 250 gallons per minute at 150 PSI and discharges the water at 75 PSI from the first turbine outlet and this discharge is then piped over to the second turbine 42 so that the water is supplied thereto at 75 PSI and is discharged therefrom at 0 PSI. This would be a series type hook-up. Also, the device could be operated by the use of one turbine, in which case either turbine 42 or 86 alone would be arranged to drive both the impeller 40 and the oil pump 72.

It is also noted that the device could be modified for arctic applications, in which case it would be desirable to incorporate in the floats 19 and 21 a steam jacket or a resistance heater for heating the oil and maintaining it in a more fluid condition.

What is claimed is:

1. An oil separator for use in cleaning up oil spills comprising:
   means providing a horizontally extending elongated flow passage having a circular cross-section,
   means providing an inlet chamber at one end of said flow passage for receiving an oil/water mixture from the surface of a body of water containing an oil spill,
   means for causing an oil/water mixture to flow from said inlet chamber through said horizontal flow passage in a spinning flow path from said one end thereof to the other end thereof with said oil concentrating in the center of said flow path, said last-named means including an axial flow impeller located at said one end of said flow passage and a water-driven turbine constructed and arranged to cause rotation of said axial flow impeller, said turbine including a housing and a bladed impeller rotatably mounted in said housing, said housing having an inlet and an outlet for the flow of water into and out of said housing,
   means for collecting the oil in the center of said flow path as it flows to the other end of said flow passage, said last-named means including an oil collector located at the center of said circular flow passage and constructed and arranged to direct the collected oil to a discharge from said other end of said flow passage,
   means for pumping said collected oil from said discharge to a surface location, said oil pumping means including a pump and means for driving said pump,
   float means constructed and arranged to support the oil separator near the surface of the body of water containing the oil spill so as to collect an oil water mixture located thereat, a main pump having a suction and a discharge and lines for connecting the discharge of said main pump to the inlet of said water driven turbine for driving the same, and means for supplying water to the suction of said main pump from the body of water containing the oil spill.

2. An oil separator according to claim 1 wherein said means for pumping collected oil from said discharge to a surface location comprises a hose, and including an expandable tank connected to the downstream end of said last-named hose for receiving the flow of oil from said oil pumping means.

3. An oil separator according to claim 1 wherein said oil collecting means comprises a collector tube located centrally within said flow passage and extending along the axis thereof, the upstream end of said tube being open to receive the inflow of oil concentrated in the center of said flow path.

4. An oil separator according to claim 3 wherein said pump comprises a centrifugal pump having an impeller rotatable within a pump body, said collector tube providing a rotating suction line integrated with said impeller to supply oil thereto.

5. An oil separator according to claim 1 including means providing an inlet opening extending across the top of said inlet chamber for the flow of the oil/water mixture from the surface of said body of water into said inlet chamber.

6. An oil separator according to claim 5 wherein said inlet opening providing means comprising a coarse screen extending across said inlet opening and means for mounting said screen for vertical adjustment to vary the height of said inlet opening.

7. An oil separator according to claim 5 including means providing a catch basin extending around said inlet opening to confine a buildup of the oil/water mixture above said inlet opening.

8. An oil separator according to claim 7 wherein said catch basin comprises an upright wall means extending around said inlet opening and projecting vertically therefrom, said walls means including an aft wall and a pair of side walls defining an open mouth opposite said aft wall.

9. An oil separator according to claim 8 including means for directing the oil/water mixture from the surface of said body of water into said mouth of said catch basin including a pair of elongated members each extending from an end of said sidewalls forwardly from said catch basin in a diverging relation relative to one another and to said flow passage providing means.

10. An oil separator according to claim 9 wherein the forward ends of said elongated members are secured by line means to said flow passage providing means, said elongated members being adapted to float in the body of water with substantial portion thereof extending above the surface of said body of water.

11. An oil separator according to claim 1 wherein said oil pumping means includes a pump and including a second lightweight water driven turbine for driving said pump and including a housing and a bladed impeller mounted for rotation within said housing, said housing having an inlet and an outlet for directing water into and out of said housing for driving said bladed impeller.

12. An oil separator according to claim 1 including means for delivering the water discharged from said outlet of said housing of said water driven turbine back into the body of water containing the oil spill.

13. An oil separator for use in cleaning up oil spills comprising:

means providing an elongated flow passage having a circular cross-section, means providing an inlet chamber at one end of said flow passage for receiving an oil/water mixture from the surface of a body of water containing an oil spill, means for causing an oil/water mixture to flow from said inlet chamber through said flow passage in a spinning flow path from said one end thereof to the other end thereof with said oil concentrating in the center of said flow path, said last-named means including an axial flow impeller located at said one end of said flow passage and a water-driven turbine constructed and arranged to cause rotation of said impeller, means for collecting the oil in the center of said flow path as it flows to the other end of said flow passage, said last-named means including an oil collector located at the center of said circular flow passage and constructed and arranged to direct the collected oil to a discharge from said other end of said flow passage, means for pumping said collected oil from said discharge to a surface location, said oil pumping means including a pump and means for driving said pump, and float means constructed and arranged to support the oil separator near the surface of the body of water containing the oil spill so as to collect an oil-water mixture located thereat, said oil collecting means comprising a perforated tube located centrally within said flow passage and extending along the axis thereof from said flow passage to said oil discharge, and an open funnel surrounding said perforated tube and constructed and arranged to direct the oil in the center of said flow passage inwardly toward said perforated tube.

14. An oil separator for use in cleaning up oil spills comprising:

means providing an elongated flow passage having a circular cross-section, means providing an inlet chamber at one end of said flow passage for receiving an oil/water mixture from the surface of a body of water containing an oil spill, means for causing an oil/water mixture to flow from said inlet chamber through said flow passage in a spinning flow path from said one end thereof to the other end thereof with said oil concentrating in the center of said flow path, said last-named means including an axial flow impeller located at said one end of said flow passage and a water-driven turbine constructed and arranged to cause rotation of said impeller, means for collecting the oil in the center of said flow path as it flows to the other end of said flow passage, said last-named means including an oil collector located at the center of said circular flow passage and constructed and arranged to direct the collected oil to a discharge from said other end of said flow passage, means for pumping said collected oil from said discharge to a surface location, said oil pumping means including a pump and means for driving said pump, and float means constructed and arranged to support the oil separator near the surface of the body of water containing the oil spill so as to collect an oil-water mixture located thereat, said oil collecting means comprising a collector tube located centrally within said flow passage and extending along the axis thereof, the upstream end of said tube being open to receive the inflow of oil concentrated in the center of said flow path, said pump comprising a centrifugal pump having an impeller rotatable with a pump body, said collector tube providing a rotating suction line integrated with said impeller to supply oil thereto, said oil collecting means comprising a funnel means mounted on said collector tube in concentric relation thereto for conjoint rotation therewith, said funnel means being constructed and arranged to direct the oil in the center of said flow passage inwardly toward said collector tube, said collector tube being provided with a plurality of openings throughout for receiving said inwardly directed oil.

15. An oil separator according to claim 14 wherein said collector tube and funnel means are constructed and arranged so that their conjoint rotation increases the rotational velocity of the spinning liquid flowing along the length of said flow passage to thereby improve the separation of the oil and water, with the water flowing outwardly towards the periphery by centrifugal force and the lighter oil concentrating in the center of the flow path, said funnel means being provided with openings throughout the surface thereof to provide passages for the flow of water outwardly toward the periphery of said flow passage as a result of said spinning thereof.

16. An oil separator for use in cleaning up oil spills comprising:
   means providing an elongated flow passage having a circular cross-section,
   means providing an inlet chamber at one end of said flow passage for receiving an oil/water mixture from the surface of a body of water containing an oil spill,
   means for causing an oil/water mixture to flow from said inlet chamber through said flow passage in a spinning flow path from said one end thereof to the other end thereof with said oil concentrating in the center of said flow path, said last-named means including an axial flow impeller located at said one end of said flow passage and a water-driven turbine constructed and arranged to cause rotation of said impeller,
   means for collecting the oil in the center of said flow path as it flows to the other end of said flow passage, said last-named means including an oil collector located at the center of said circular flow passage and constructed and arranged to direct the collected oil to a discharge from said other end of said flow passage,
   means for pumping said collected oil from said discharge to a surface location, said oil pumping means including a pump and means for driving said pump, and
   float means constructed and arranged to support the oil separator near the surface of the body of water containing the oil spill so as to collect an oil-water mixture located thereat,
   said flow passage providing means comprising an elongated tube,
   means for securing together said inlet providing means, said axial flow impeller, and said water driven turbine to form an inlet unit,
   means for securing said oil collecting means and said pumping means together to form a discharge unit,
   a quick-connect coupling means for securing said inlet unit to one end of said elongated tube, and
   a quick-connect coupling means for securing said discharge unit to the other end of said elongated tube.

17. An oil separator according to claim 16 wherein said float means comprises a first float forming part of said inlet unit and a second float forming part of said discharge unit.

18. An oil separator for use in cleaning up oil spills floating on bodies of water, including the open seas, comprising:
   power operated separating means for drawing an oil/water mixture from the surface of a body of water containing an oil spill and separating the oil and water,
   said power operated means including a lightweight water driven turbine as a power source for operating the same, said water driven turbine including a housing and a bladed impeller mounted for rotation within said housing, said housing having an inlet and an outlet for directing water into and out of said housing for driving said impeller,
   means for pumping the separated oil to a remote location for storage thereof,
   float means for supporting said power operated separating means, including said water driven turbine thereof, and said pumping means in the body of water containing the oil spill,
   a main pump having a suction and a discharge and lines for connecting the discharge of said main pump to the inlet of said water driven turbine for driving the same, and
   means for supplying water to the suction of said main pump from the body of water containing the oil spill.

19. An oil separator according to claim 18 including means for delivering water from the outlet of said housing of said water driven turbine back into said body of water containing the oil spill.

20. An oil separator according to claim 18 wherein said oil pumping means includes a pump and second light-weight water driven turbine for driving said pump and including a housing and a bladed impeller mounted for rotation within said housing, said housing having an inlet and an outlet for directing water into and out of said housing for driving said impeller.

21. An oil separator for use in cleaning up oil spills comprising:
   means providing a horizontally extending elongated flow passage having a circular cross-section,
   means providing an inlet chamber at one end of said flow passage for receiving an oil/water mixture from the surface of a body of water containing an oil spill,
   means for causing an oil/water mixture to flow from said inlet chamber through said horizontal flow passage in a spinning flow path from said one end thereof to the other end thereof with said oil concentrating in the center of said flow path, said last-named means including an axial flow impeller located at said one end of said flow passage and a water-driven turbine constructed and arranged to cause rotation of said axial flow impeller, said turbine including a housing and a bladed impeller rotatably mounted in said housing, said housing having an inlet and an outlet for the flow of water into and out of said housing, means for collecting the oil in the center of said flow path as it flows to the other end of said flow passage, said last-named means including an oil collector located at the center of said circular flow passage and constructed and arranged to direct the collected oil to a discharge from said other end of said flow passage, means for pumping said collected oil from said discharge to a surface location, said oil pumping means including a pump and means for driving said pump, float means constructed and arranged to support the oil separator near the surface of the body of water containing the oil spill so as to collect an oil water mixture located thereat, a main pump having a suction and a discharge and lines for connecting the discharge of said main pump to the inlet of said water driven turbine for driving the same, means for supplying water to the suction of said main pump from a water supply, and means for delivering water from the outlet of said housing of said water driven turbine into said body of water containing the oil spill.

22. An oil separator for use in cleaning up oil spills floating on bodies of water, including the open seas, comprising:

power operated separating means for drawing an oil/water mixture from the surface of a body of water containing an oil spill and separating the oil and water, said power operated means including a lightweight water driven turbine as a power source for operating the same, said water driven turbine including a housing and a bladed impeller mounted for rotation within said housing, said housing having an inlet and an outlet for directing water into and out of said housing for driving said impeller, means for pumping the separated oil to a remote location for storage thereof, float means for supporting said power operated separating means, including said water driven turbine thereof, and said pumping means in the body of water containing the oil spill, a main pump having a suction and a discharge and lines for connecting the discharge of said main pump to the inlet of said water driven turbine for driving the same, means for supplying water to the suction of said main pump from a water supply, and means for delivering water form the outlet of said housing of said water driven turbine into said body of water containing the oil spill.

* * * * *